Oct. 14, 1969 T. J. OWEN 3,472,062
TESTABLE AND PRESSURIZED MULTIPLE PLY BELLOWS
Filed Sept. 13, 1967 3 Sheets-Sheet 1

INVENTOR.
THOMAS J. OWEN
BY Carl R. Brown
attorney

Oct. 14, 1969 T. J. OWEN 3,472,062
TESTABLE AND PRESSURIZED MULTIPLE PLY BELLOWS
Filed Sept. 13, 1967 3 Sheets-Sheet 2

INVENTOR.
THOMAS J. OWEN
BY Carl R. Brown
Attorney

Oct. 14, 1969    T. J. OWEN    3,472,062
TESTABLE AND PRESSURIZED MULTIPLE PLY BELLOWS
Filed Sept. 13, 1967    3 Sheets-Sheet 3

INVENTOR.
THOMAS J. OWEN
BY Carl R. Brown
Attorney

United States Patent Office 3,472,062
Patented Oct. 14, 1969

3,472,062
TESTABLE AND PRESSURIZED MULTIPLE PLY BELLOWS
Thomas J. Owen, El Cajon, Calif., assignor to Pathway Bellows, Inc., El Cajon, Calif., a corporation of California
Filed Sept. 13, 1967, Ser. No. 667,511
Int. Cl. G01m *3/04;* F01b *19/00*
U.S. Cl. 73—40.5                           8 Claims

ABSTRACT OF THE DISCLOSURE

A multiple ply bellows is provided having means for evacuating or applying a pressurized fluid to the sealed space between the plies of the bellows to test the sealed space or to prevent leakage through the plies. Means responsive to the pressure within the inner surface of the bellows is provided for controlling the pressure of the sealed space to maintain a predetermined pressure relationship between the inner surface of the bellows and the sealed space.

SUMMARY OF THE INVENTION

The manufacture and use of multiple ply bellows is well known and such bellows have found considerable use in many applications where greater flexing is desired for the same effective wall thickness. Such multiple ply bellows have a small space or interstitial gap between the respective plies. This space is employed in my invention to detect the presence or absence of leaks through the plies and thus through the bellows and to prevent leaks of hazardous gases to the surrounding environment.

Preferred embodiments of this invention take the form of a multiple ply bellows having means, such as a connection or the like, for transmitting a pressurized fluid to, or drawing a vacuum on, the sealed interstitial gap or space between the plies of the multiple ply bellows. The pressurized fluid or vacuum is then monitored to test the plies for the presence or absence of leaks. The connection means are normally connected at the weld ends in a manner to communicate with the spaces between the plies. Thus the connections do not detract from the structural strength, integrity or operation of the multiple ply bellows. My invention thus makes it possible to apply a pressure or a vacuum to the interstitial space between the plies of a two-ply or multiple ply metal bellows to accomplish a test for leaks that may be periodic or continuous and that can be carried out while the bellows assembly is in service.

In a particular embodiment of the invention, pressurized gas is applied to the interstitial space and a pressure gauge is used to establish the existance or non-existance of leaks. Continuous monitoring may be accomplished by use of automatic equipment known in the art, such as electrically operated pressure sensing devices, pressure transducers or the like. A whole series of such installations can be wired to a central test panel wherein identifying signals show immediately when any of several bellows incur a leak.

In another embodiment of my invention an inert pressurized gas is applied between the plies of mutiple ply bellows with a pressure that exceeds the pressure of the fluid being carried by the bellows. Thus if a leak occurs, the inert gas flows into the line rather than the hazardous gas flowing out through the leak. This results in drop in pressure of the inert gas that is detected by pressure gauges or the like. Also a continuous vacuum can be maintained on the interstitial spaces that draws off hazardous fluid that may leak through the plies to the spaces. Appropriate means can then detect the presence of the hazardous gas in the evacuating system.

It is therefore an object of this invention to provide a new and improved means for testing a bellows assembly for leaks.

It is another object of this invention to provide a new and improved means for testing multiple ply bellows for leaks.

It is another object of this invention to provide a new and improved means for applying a gas under pressure to the space between plies in a multiple ply bellows to prevent leakage of a hazardous gas to the surrounding environment.

It is another object of this invention to provide a new and improved means for testing multiple ply bellows for leaks, which testing may be accomplished while the bellows assembly is in service.

It is another object of this invention to provide a new and improved multiple ply bellows that may be tested for leaks periodically or continuously while the bellows assembly is in service.

Further objects and advantages of the present invention will readily occur to one skilled in the art to which the invention pertains upon reference to the following detailed description and the accompanying drawings wherein like reference characters designate like parts throughout and in which.

Figure 1:
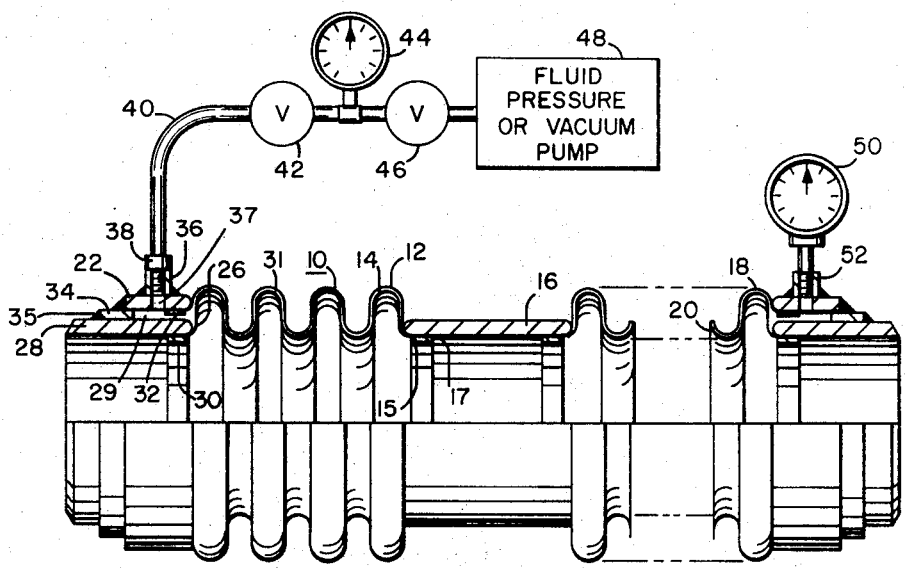
FIGURE 1 is a side view wtih parts being broken away and parts in section of an embodiment of my invention.
Figure 3:
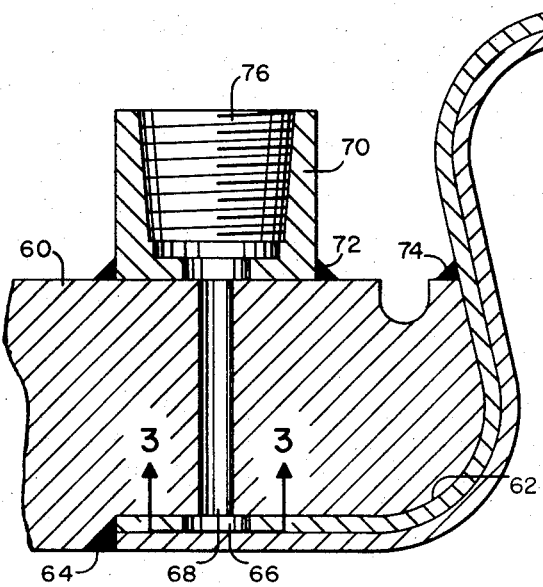
FIGURE 3 is a sectional view looking in a direction opposite to the direction of arrows 3—3 of FIGURE 2.

Referring now to FIGURE 1, there is illustrated a bellows assembly 10 having a pair of two-ply bellows sections. The bellows section on the left has an inner ply 14 and an outer ply 12. The bellows section on the right has an outer ply 18 and an inner ply 20. The two bellows sections are joined by weld hub 16 to which the ends of the plies 12, 14, 18 and 20 are welded between an inner ring member 15 and the weld hub 16. It may be understood that the weld hub 16 may fit through a wall or other suitable hanger member through which the conduit that is joined by the respective bellows passes.

In this embodiment, the inner ply 14 is welded to the weld end 28 between the inner surface of the weld end 28 and inner ring 30. The outer ply 12 is welded to the inner surface of the weld end 22 and to the inner ring 32. A ring member 34 is welded to the outer surface of the weld end 28 by weld 35 and the outer weld end 22 is welded to the outer surface of the ring member 34. Thus the weld ends 28 and 22 and the ring member 34 form an integral sealed end structure. A space 29 between the outer weld end 22 and the inner weld end 28 communicates with the interstitial space between the plies 12 and 14. A connection means 36 comprising a cylinderical connector that is welded to the outer surface of the weld end 22 and a passage therethrough communicates through an aperture 37 in the weld end 22 with space 29. Connector 36 has threads therein for receiving a threaded male connector 38 that is secured to line 40.

A fluid pressure or vacuum pump 48 may have any known construction that is capable of supplying a fluid, such as gas or the like, at a given pressure. The gas may preferably comprise air, heluim, nitrogen, or a halides gas. This fluid flows through valves 46 and 42 to line 40 and through cavity 29 to the interstitial space between plies 12 and 14. It being understood that the ends of the plies 12 and 14 are sealed by weld 17 and the cavity 29 is sealed in the manner previously described. After a sufficient pressure has been applied to the space between the plies 12 and 14, then valve 46 is closed and valve 42 is left open and pressure gauge 44 indicates any decrease in pressure that indicates a leak. At the end of the test, valve 46 is again opened and the gas pressure is vented through the fluid pressure or vacuum pump 48.

The vacuum pump portion of unit 48 may also selectively draw a vacuum through line 40 on the space between plies 12 and 14. Valve 46 is again closed and meter 44 in this embodiment reads absolute pressures. The vacuum test establishes whether any outside gases are being drawn through a leak in the plies.

It may be readily understood that this system of testing the bellows for leaks may be accomplished without interruption of the bellows assembly in carrying gases, fluids, or the like. Accordingly the test may be carried out while the bellows assembly is in service. Also it may be understood that many types of automatic equipment may be used to selectively operate the valves 42 and 46 and the fluid pressure or vacuum pump 48 to detect leaks in the plies of the bellows on an automatic or periodic basis. In such an installation, meter 44 would operate as an automatic recorder for the leaks. Alarm systems may also be installed to be operable by a distinct change in the meter reading of meter 44. When the system is not being tested, then air or gas pressure may be vented through the fluid pressure or vacuum pump 48 by leaving valves 42 and 46 open. This allows air to flow in and out of the space between the plies to equalize pressures in the space between the plies 12 and 14 as may be necessary when the bellows are used in high temperature environments.

The plies 18 and 20 of the bellows on the right side have the same construction as the previously described bellows on the left side. However a meter 50 is secured to connector 52. It being understood that when the bellows assembly is in service, it either carries a fluid under pressure or a vacuum. Thus any leak in the inner ply of the bellows may be detected by the effect this has on the pressure condition in the space between the plies 18 and 20.

While only a single connector 38 or 52 is illustrated as being monuted on the respective weld ends 22 and 28, it should be understood that any number of such connectors may be installed around the circumference of the weld end. However, generally it is only necessary to have a single connector, although it may be desirable to have a separate connector for the meter 50 and a separate connector for applying a pressure or vacuum to the space between the plies.

Figure 2:
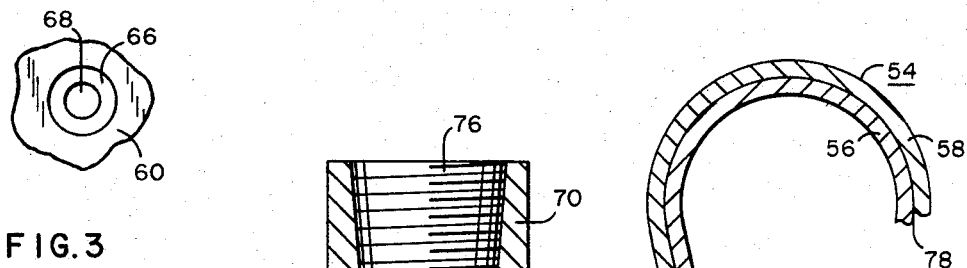
FIGURE 2 is a cross sectional view with parts broken away of another embodiment of my invention.

A second embodiment is illustrated in FIGURE 2 and comprises a two-ply bellows 54 with an inner ply 56 and an outer ply 58. It should be understood that the bellows in FIGURE 2 has a cylindrical shape with the other end of the plies 56 and 58 being sealed and secured by welding to a weld end, weld hub or the like (not shown). The ends of the plies 56 and 58 are welded by a weld 64 to the inner surface of a weld end 60. The outer surface of the outer ply 58 is welded by weld 74 to the upper end of the weld end 60 around the entire circumference of the bellows in a manner that weld 74 and weld 64 seal the interstitial space 78 between the plies 56 and 58.

Secured by weld 72 to the outer surface of the weld end 60 is a connector 70 having internal threads 76. The weld 72 seals the cylindrical hole or channel of connector 70 and the cylindrical hole or channel 68 against leakage. The channel 68 through the weld end 60 communicates with an aperture 66 through the outer ply 58. While aperture 66 is preferably located in alignment with channel 68, it should be recognized that direct alignment is not entirely necessary since the space between the outer surface of the ply 58 and the inner surface 62 of the weld end 60 are sealed by welds 64 and 74. Accordingly a gas under pressure applied through line 40 that is connected to connector 70, will pass through channel 68 and into the interstitial space 78 in the manner previously described relative to FIGURE 1. This allows the plies 56 and 58 to be tested for leaks. Also a vacuum may be drawn through the channel 68 in the manner previously described to also test the plies 58 and 56 for leaks.

Figure 4:
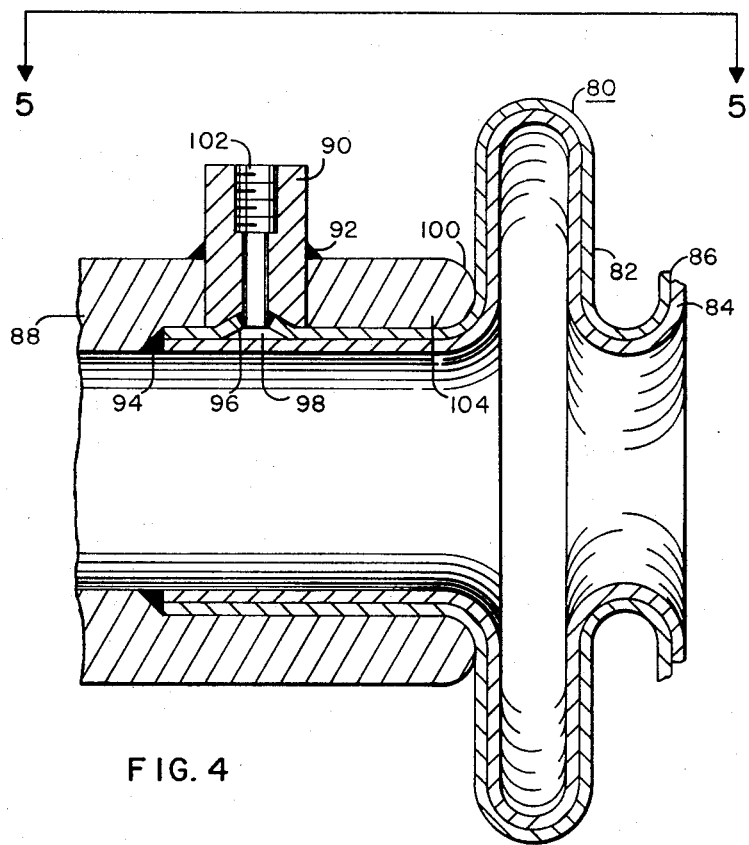
FIGURE 4 is a cross sectional view with parts broken away of still another embodiment of my invention.

Referring now to FIGURE 4, another embodiment of the invention is illustrated wherein bellows 80 comprise a pair of plies 82 and 84 having an interstitial gap or space 86 therebetween. The weld end 88 has a configuration somewhat similar to that in the embodiment of FIGURE 2 and the ends of the plies are welded in a sealing connection by weld 94 to the inner surface of the weld end 88. The outer ply 82 has an aperture 96 with a raised edge that conforms to the conically shaped lower end of connector 90. The aperture 96 is welded around its circumference to the connector 90 forming a sealed connection for communicating with the channel 102 through the connector 90. Connector 90 has a cylindrical shape that fits through a corresponding cylindrical opening in the weld end 88. A weld 92 around the outer circumference of the connector 90 secures the connector 90 to the weld end 88 and seals the connection. Plies 82 and 84 are shaped to conform to the general rounded end 100 of the weld end 88 and no weldment at this point is necessary since there is no sealing necessary in view of the sealed connection of the channel 102 to the outer ply 82 through aperture 96.

In operation, a line such as line 40 is connected by a suitable connector 38 to the channel 102 and the interstitial space 86 between plies 82 and 84 is tested for leakage in the manner previously described.

Figure 5:
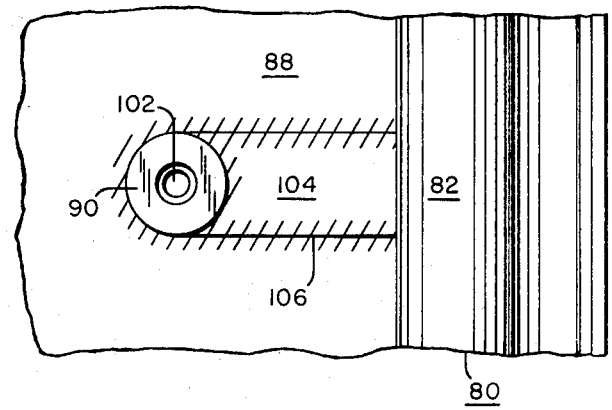
FIGURE 5 is a view taken along lines 5—5 to illustrate the construction of the embodiment of my invention illustrated in FIGURE 4.

In assembly of the embodiment illustrated in FIGURE 4, the slotted portion 104 of the weld end 88 is cut as illustrated in FIGURE 5. The weld is made around aperture 96 to the connector 90 and the structure is then slidably positioned to the weld end 88. The slotted portion 104 is then inserted and welded in place. The weld 106 of member 104 to the weld end 88 need only be sufficient to provide structural integrity of the weld end 88, since sealing is not necessary at this point for the reasons previously stated.

Figure 6:
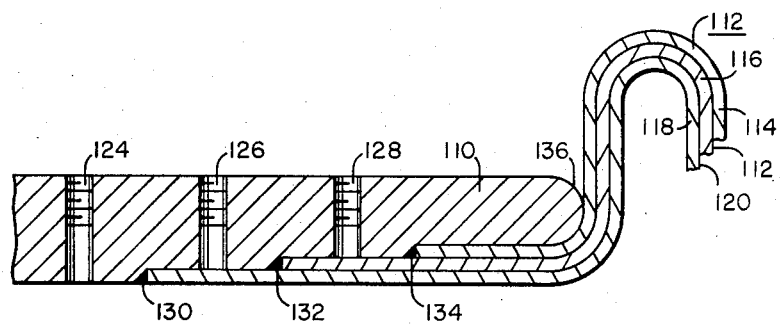
FIGURE 6 is a cross sectional view with parts broken away of still another embodiment of my invention.

Referring now to FIGURE 6, still another embodiment of my invention is illustrated wherein a bellows 112 has multiple plies. In this embodiment, for example, there are three plies, namely plies 114, 116, and 118. The ends of the plies are welded in stepped recesses to the inner surface of the weld end 110. The welds 130, 132 and 134 secure the ends of plies 118, 116 and 114 to the weld end 110 and also seal the ends and the outer surfaces of the respective plies against leakage. Channels 126 and 128 through weld end 110 provide a communicating channel to the interstitial space between plies 114, 116 and 118. Accordingly a fluid or glass under pressure or a vacuum applied through channel 128 is restricted to the interstitial space 112 between plies 114 and 116, and a fluid or gas under pressure or vacuum applied through channel 126, is restricted to the interstitial space 120 between plies 116 and 118. Thus it may be understood that each of the plies may be selectively tested individually or in combination for leaks in the manner previously described.

Figure 7:
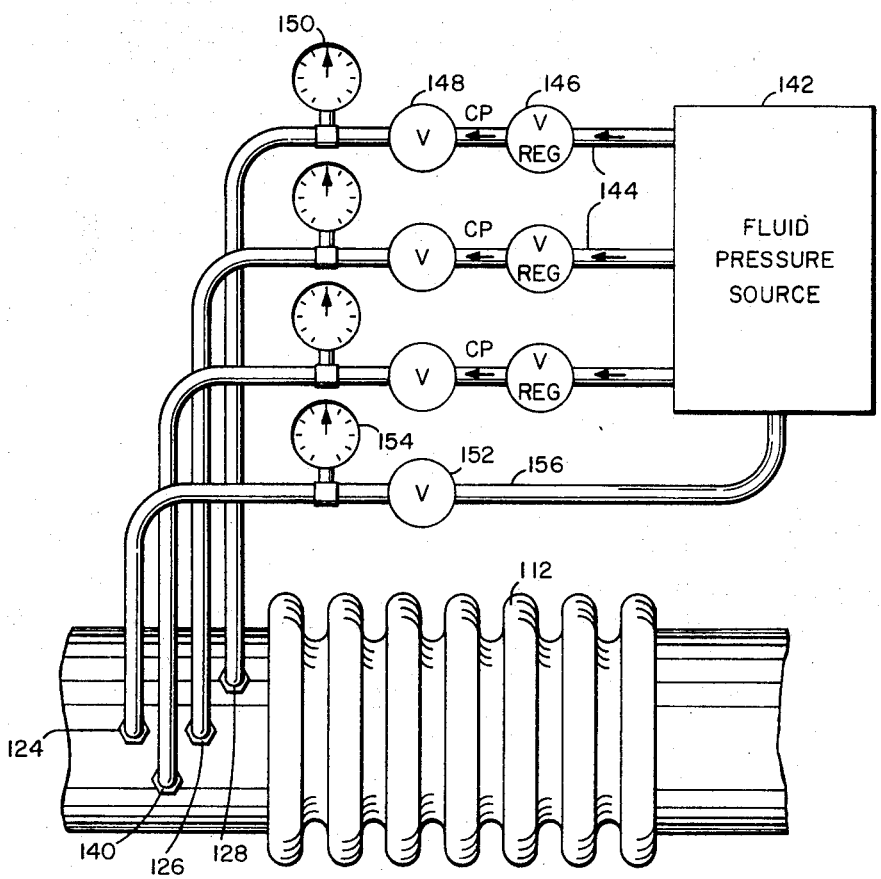
FIGURE 7 is a side view of an embodiment of my invention employed in a system for testing the sealed spaces between the plies for leaks or to apply a pressurized gas to the spaces for preventing leakage of gases carried by the bellows.

The embodiment of FIGURE 6 may also have a pressurized inert gas applied through channels 126 and 128 to provide a given pressure condition in the interstitial spaces 112 and 120. Referring to FIGURE 7, there is illustrated a fluid pressure source 142 that is connected through lines 144 to respective connectors 126, 128 and 140. In this system, it is assumed that there are four plies in the multiple ply bellows structure and there are three channels corresponding to channels 126 and 128 for communicating with the three interstitial spaces between the four plies. Valves 148 pass the fluid under pressure from the fluid pressure source 142 through lines 144 to the interstitial spaces and valves 148 may be selectively closed so that the readings of meters 150 may be used to determine the presence or absence of leaks in the respective plies.

Also the fluid pressure source 142 may be used to supply an inert gas such as nitrogen or the like with a constant pressure to the interstitial spaces between the bellows 112, which gas has a pressure greater than the pressure of the fluid carried by the bellows assembly when in service. Thus, for example, where the bellows assembly is carrying a highly reactive or hazardously fluid, such as a radio active fluid or a toxic gas, any leakage in the inner ply or in more than one of the plies will result in an outward flow of the inert gas and the hazardous fluid or gas is prevented from escaping through the multiple ply bellows 112 and to the outer atmosphere to contaminate the area around the bellows.

A channel 124 through the weld end 110 is connected by line 156 to the fluid pressure source 142. This establishes the intelligence to the fluid pressure source 142 of the fluid pressured carried by the bellows assembly. The fluid pressure source automatically provides a gas pressure to the interstitial spaces between the plies that exceeds the fluid pressure carried by the bellows assembly. Pressure regulators 146 may be selectively used for controlling the pressure to the connectors 126, 128, and 140 as desired.

Thus the present invention provides a means for testing the plies of multiple ply bellows for leaks and also provides the means for pressurizing the interstitial spaces between the plies to prevent leakage of toxic gases carried by the bellows assembly to the outer atmosphere.

Having described my invention, I now claim.

1. In a multiple ply bellows,
   means for sealing the interstitial space between the plies of said bellows,
   said sealing means has weld ends that are connected to each end of said bellows,
   said plies are sealed at the connections to said weld ends, means for communicating with said sealed space between said plies,
   said communicating means comprises at least one sealed connector having an opening that is open to said space between said pair of plies,
   said sealed connector is positioned adjacent at least one of the connections to said weld ends,
   at least one of said weld ends comprises an inner weld end and an outer concentrically positioned weld end,
   said outer and inner weld ends are joined together by a sealed connection at one of their side edge portions,
   the end of each of a pair of plies is connected by a sealing ring to the other side edge portion of each of said inner and outer weld ends,
   and said sealed connector opening passes through said outer weld end to communicate with the sealed space between said inner and outer weld ends and said pair of plies.

2. In a multiple ply bellows as claimed in claim 1 in which, said sealed connection comprises a spacer ring that is positioned between said inner and outer weld ends.

3. In a multiple ply bellows,
   means for sealing the interstitial space between the plies of said bellows,
   said sealing means has weld ends that are connected to each end of said bellows,
   said plies are sealed at the connections to said weld ends,
   means for communicating with said sealed space between said plies,
   said communicating means comprises at least one sealed connector having an opening that is opened to said space between a pair of said plies,
   said sealed conector is positioned adjacent at least one of the connections to said weld ends,
   said plies are each connected at one end by a first sealed connection to the inner suface of one of the weld ends at a position displaced from the end of each said weld end,
   the outer ply of said plies is connected by a second sealed connection to the end of said weld end,
   said outer ply has at least one opening therethrough between said first and second sealed connections,
   and said sealed connector opening passes through said weld end to communicate via said opening in said outer ply with the sealed space between said first and second sealed connections.

4. In a multiple ply bellows,
   means for sealing the interstitial space between the plies of said bellows,
   said sealing means has weld ends that are connected to each of said bellows,
   said plies are sealed at the connections to said weld ends,
   means for communicating with said sealed space between said plies and transmitting a pressure or vacuum to said space,
   said communicating means comprises at least one sealed connector having an opening that is open to said space between a pair of said plies,
   said sealed connector is positioned adjacent at least one of the connections to said weld ends,
   said plies are connected by a first sealed connection to the inner surface of one of the weld ends at a position displaced from the end of said weld end,
   the outer ply of said plies have at least one opening therethrough,
   said connector opening passes through said weld end to communicate with said opening in said outer ply,
   and the edge of said opening in said outer ply and the adjacent edge of said connector opening are connected by a second sealed connection.

5. In a multiple ply bellows as claimed in claim 4 in which,
   said connector comprises a cylindrical member for fitting through a hole in said weld end,
   said connector opening passes through said connector and terminates with an inwardly directed conical recess adjacent said outer ply,
   said edge of said opening in said outer ply is slanted outwardly to substantially fit into said conical recess,
   and said edge of said opening in said outer ply is welded to the surface of said conical recess.

6. In a multiple ply bellows,
   means for sealing the interstitial space between the plies of said bellows,
   said sealing means has weld ends that are connected to each of said bellows,
   said plies are sealed at the connections to said weld ends,
   means for communicating with said sealed space between said plies,
   said communicating means comprises at least one sealed connector having an opening that is open to said space between a pair of said plies,
   said sealed connector is positioned adjacent at least one of the connections to said weld ends.
   the inner one of said plies is connected by a first sealed connection to the inner surface of a single weld end at a position displaced from the outer edge of said weld end,
   the next outer ply is connected by a second connection to the inner surface of said weld end at a location positioned between said first sealed connection and said outer edge of said weld end,
   and said connector opening passes through said weld end to communicate with the sealed space between said inner surface of said weld end and the outer surface of said inner ply between said first and second sealed connections.

7. In a multiple ply bellows as claimed in claim 6 in which,
a third ply is positioned radially outside said next outer ply and is connected by a third sealed connection to the inner surface of said weld end at a position between said second sealed connection and said edge of said weld end,
and a second connector opening passes through said weld end to communicate with the sealed space between the inner surface of said weld end and the outer surface of said next outer ply between said second and third sealed connections.

8. In a multiple ply bellows,
means for sealing the interstitial space between the plies of said bellows,
means for communicating with said sealed space between said plies and transmitting a pressure or vacuum to said space,
said bellows have more than two plies and more than one interstitial space,
said communicating means have at least one connector for each of said interstitial spaces,
each of said connectors has a sealed opening that is open solely to the respective one of said interstitial spaces,
means connected to each of said connectors for detecting leaks to each of said interstitial spaces,
pressure source means capable of being connected to each of said connectors for applying a pressurized fluid to each of said interstitial spaces,
and means responsive to the pressure within the inner surface of the bellows for controlling the pressure of the fluid output of said pressure source means to maintain a predetermined pressure relationship therebetween.

References Cited
UNITED STATES PATENTS

| | | | |
|---|---|---|---|
| 3,008,737 | 11/1961 | Longfellow | 285—149 |
| 3,087,745 | 4/1963 | Rumbell | 285—93 XR |
| 3,183,022 | 5/1965 | Sayag | 285—93 |
| 3,232,640 | 1/1966 | Doukle | 73—40.7 XR |
| 3,299,417 | 1/1967 | Sibthorpe | 73—49.1 XR |
| 3,339,415 | 9/1967 | Wild | 73—40.5 |

FOREIGN PATENTS 1,195,103  6/1965  Germany.

LOUIS R. PRINCE, Primary Examiner
JEFFREY NOLTON, Assistant Examiner

U.S. Cl. X.R.
92—34, 47; 285—93